Oct. 3, 1944.  J. A. DISSE  2,359,408
SCRAPER
Filed Jan. 17, 1944
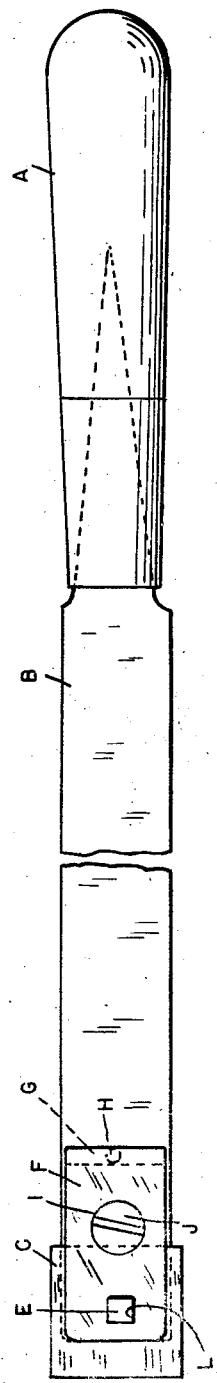
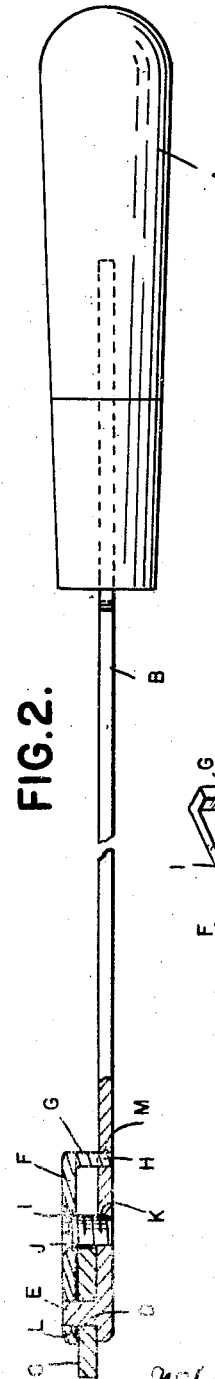
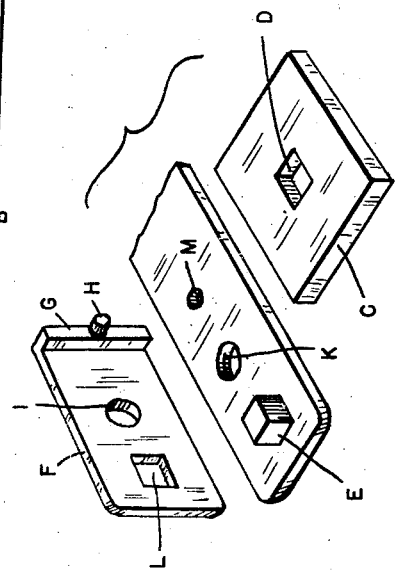
INVENTOR.
JOSEF A. DISSE
BY
ATTORNEYS Patented Oct. 3, 1944

2,359,408

UNITED STATES PATENT OFFICE 2,359,408

SCRAPER

Josef A. Disse, Detroit, Mich.

Application January 17, 1944, Serial No. 518,621

3 Claims. (Cl. 30—169)

The invention relates to scrapers such as are used for truing metal surfaces and for other similar purposes.

It is the object of the invention to obtain a construction in which the scraping edges are formed on a blade which is separate from the handle and of a minimum size. This is particularly advantageous where the blade is formed of expensive material.

It is a further object to provide the blade with a maximum number of scraping edges which may be alternatively used in the performance of the work. With these and other objects in view, the invention consists in the construction as hereinafter set forth.

In the drawing:

Figure 1 is a plan view of my improved scraper.

Figure 2 is a central longitudinal section thereof.

Figure 3 is a perspective view of the several parts of the scraper detachable from each other.

A is a suitable handle, and B a forwardly extending handle shank to which the scraping blade is detachably secured. This blade C is polygonal and preferably square, being of a width which is somewhat greater than the width of the shank. Centrally of the blade is a polygonal aperture extending therethrough which is similar to the peripheral shape. Thus as shown, the aperture D is a small square and is adapted to engage a post E of similar shape projecting from the face of the shank B. F is a clamping plate for securing the blade to the shank, being provided at its rear end with an angle flange G and a pintle H projecting centrally from said flange. Intermediate its ends the plate F is apertured at I to receive a headed clamping screw J and the shank B is provided with a screw threaded aperture K with which the screw J is engaged. There is also preferably an aperture L in the plate F which registers with the post E to receive the same.

With the construction above described, the blade C can be quickly attached to the handle shank by engaging the post E with the aperture D. The clamping plate F is then engaged by inserting the pintle H in an aperture M in the shank which is positioned to register the apertures L and I in the plate respectively with the post E and screw threaded aperture K. The screw J is then engaged and tightened which will hold the blade C rigidly in position with a portion projecting forward of the shank B having the scraping edge. Whenever this edge becomes dull, the blade may be quickly changed in position on the post E to present another scraping edge for use and as there are four sides to the square and each side has two parallel edges, this will give eight possible scraping edges for use. While I prefer to use a square blade, it is obvious that other polygonal forms might be substituted therefor, but in each case the central aperture should be of a similar polygonal form.

In operation the blade C may be ground with each of the sides of the square at the desired angle to the face thereof, according to the particular character of the work for which it is used. As the amount of material removed in the sharpening of the scraping edges is very small, the blade will have a long life. Also, because of its small size, the cost of replacement will be correspondingly small.

What I claim as my invention is:

1. A scraper tool comprising a handle provided with a forwardly extending shank, an attachable blade of polygonal form provided with a central aperture of similar shape, a clamping plate having a fulcrum portion at its inner end for engaging said shank and bearing with its outer end portion upon said blade, a screw between said fulcrum and blade for securing said clamping plate to the shank and a post for fitting said polygonal aperture in the blade extending between said shank and clamping plate, being secured to the one and engaging an aperture in the other.

2. A scraper tool comprising a handle having a forwardly extending shank, a polygonal post projecting from the face of said shank near the outer end thereof, a blade of similar polygonal form and having a similar polygonal aperture centrally therethrough for fitting said post, a clamping plate apertured to receive the projecting portion of said post when said blade is engaged with the latter, a flange projecting from the rear end of said clamping plate forming a fulcrum bearing on said shank, a pintle projecting from said flange to engage a registering aperture in said shank and a screw for securing said clamping plate to said shank located between said pintle and post so as to clear the inner edge of said plate.

3. A scraper tool comprising a handle provided with a forwardly extending shank, a square blade of a width greater than that of the shank having a square central aperture therethrough, a clamping plate having a fulcrum bearing at its inner end for engaging said shank, a square post for fitting and engaging the square aperture in the blade and extending between said shank and clamping plate, being secured to the one and engaging an aperture in the other, being also located to project one side of the blade beyond the end of the shank and clamping plate and a screw for securing said clamping plate to said shank arranged between said fulcrum and post at a point which clears said blade.

JOSEF A. DISSE.